(12) United States Patent
Madhu et al.

(10) Patent No.: US 9,300,676 B2
(45) Date of Patent: Mar. 29, 2016

(54) RISK ASSESSMENT USING SOCIAL NETWORKING DATA

(71) Applicant: Socure Inc., New York, NY (US)

(72) Inventors: Sunil Madhu, New York, NY (US); Giacomo Pallotti, Brooklyn, NY (US); Edward J. Romano, Germantown, MD (US); Alexander K. Chavez, Hoboken, NJ (US)

(73) Assignee: Socure Inc., New York, NY (US)

( * ) Notice: Subject to any disclaimer, the term of this patent is extended or adjusted under 35 U.S.C. 154(b) by 0 days.

(21) Appl. No.: 14/215,477

(22) Filed: Mar. 17, 2014

(65) Prior Publication Data

US 2014/0282977 A1    Sep. 18, 2014

Related U.S. Application Data

(60) Provisional application No. 61/801,334, filed on Mar. 15, 2013.

(51) Int. Cl.
*H04L 29/06* (2006.01)
*G06F 21/00* (2013.01)

(52) U.S. Cl.
CPC .................................... *H04L 63/12* (2013.01)

(58) Field of Classification Search
CPC ...................................................... H04L 63/12
See application file for complete search history.

(56) References Cited

U.S. PATENT DOCUMENTS

| | | | | |
|---|---|---|---|---|
| 6,529,864 B1 * | 3/2003 | Chase | ............................... | 704/9 |
| 8,010,460 B2 | 8/2011 | Work et al. | | |
| 8,225,413 B1 * | 7/2012 | De et al. | ......................... | 726/26 |
| 8,316,086 B2 | 11/2012 | Ufford et al. | | |
| 8,457,367 B1 | 6/2013 | Sipe et al. | | |
| 8,670,597 B2 | 3/2014 | Petrou et al. | | |
| 8,825,759 B1 * | 9/2014 | Jackson et al. | ................ | 709/204 |
| 8,914,454 B1 * | 12/2014 | Kroleski | ........................ | 709/206 |
| 2006/0009994 A1 * | 1/2006 | Hogg et al. | ........................ | 705/1 |
| 2006/0212931 A1 | 9/2006 | Shull et al. | | |
| 2010/0333200 A1 * | 12/2010 | Chen et al. | ........................ | 726/22 |
| 2011/0191200 A1 * | 8/2011 | Bayer et al. | ................ | 705/26.1 |
| 2011/0320342 A1 | 12/2011 | Kremen | | |
| 2012/0136866 A1 * | 5/2012 | Carter et al. | .................. | 707/740 |
| 2012/0166285 A1 | 6/2012 | Shapiro et al. | | |

(Continued)

FOREIGN PATENT DOCUMENTS

| | | |
|---|---|---|
| WO | WO 2010/109332 A1 | 9/2010 |
| WO | WO 2014/145431 A1 | 9/2014 |

OTHER PUBLICATIONS

PCT/US14/30197 International Search Report dated Aug. 27, 2014.

(Continued)

*Primary Examiner* — Lisa Lewis

(74) *Attorney, Agent, or Firm* — Wilson Sonsini Goodrich & Rosati

(57) ABSTRACT

Tools, strategies, and techniques are provided for evaluating the identities of different entities to protect individual consumers, business enterprises, and other organizations from identity theft and fraud. Risks associated with various entities can be analyzed and assessed based on analysis of social network data, professional network data, or other networking connections, among other data sources. In various embodiments, the risk assessment may include calculating an authenticity score based on the collected network data.

21 Claims, 10 Drawing Sheets

(56) References Cited

U.S. PATENT DOCUMENTS

| | | | |
|---|---|---|---|
| 2012/0226579 A1 | 9/2012 | Ha et al. | |
| 2012/0226701 A1 | 9/2012 | Singh | |
| 2012/0278176 A1* | 11/2012 | Naor et al. | 705/14.66 |
| 2012/0297477 A1* | 11/2012 | Raviv | 726/22 |
| 2012/0310831 A1 | 12/2012 | Harris et al. | |
| 2013/0013489 A1* | 1/2013 | Kremen et al. | 705/38 |
| 2013/0077835 A1 | 3/2013 | Kritt et al. | |
| 2013/0121540 A1 | 5/2013 | Garcia et al. | |
| 2013/0304818 A1* | 11/2013 | Brumleve et al. | 709/204 |
| 2014/0063249 A1 | 3/2014 | Miller et al. | |
| 2014/0150109 A1* | 5/2014 | Fire et al. | 726/26 |
| 2014/0165178 A1* | 6/2014 | Perrone et al. | 726/9 |
| 2014/0196110 A1* | 7/2014 | Rubinstein et al. | 726/3 |
| 2014/0324719 A1* | 10/2014 | Canal | 705/319 |
| 2015/0058957 A1* | 2/2015 | Halliday et al. | 726/7 |
| 2015/0067061 A1* | 3/2015 | Poston | 709/204 |

OTHER PUBLICATIONS

PCT/US2014/030197 International Preliminary Report on Patentability mailed Sep. 24, 2015.

\* cited by examiner

RISK ASSESSMENT USING SOCIAL NETWORKING DATA

BACKGROUND

With the advent of the Internet and the rise of social networks, more information is being created today than has ever been created previously in the history of our society. Unfortunately, the ease of availability of personal information that people freely share on social networks, professional networks, or through other networked media makes it relatively easy for hackers and people committing fraud to steal user's credentials and identity information.

Moreover, because social networks encompass information about consumers and their friends, the vulnerability of one consumer impacts the vulnerability of their friends and vice versa in an interdependent relationship. The threat is amplified if one considers that a compromised Facebook login, for example, can be used to attack the multitude of websites on the Internet that support the use of Facebook Login as a credential to authenticate consumers at those sites. For instance, hacking a Facebook account can allow an imposter to impersonate a user at an enterprise website or mobile application where the enterprise accepts Facebook Connect Login as a trusted credential. The impersonator could also take over an account using data from the hacked account's profile or timeline. This puts consumers, merchants and financial institutions at risk on a global basis.

Unfortunately, many consumers willingly (and in most cases unwittingly) hand over personal data in exchange for a misperceived benefit that may be involved with a financial transaction. This personal information may be abused or sold to other marketers. Furthermore, the proliferation of mobile social networks, mobile payment systems, and virtual currency systems, has left many users exposed to cyber crime. This ultimately leaves many consumers feeling violated and distrustful of companies that offer legitimate products or services, and also distrustful of social platforms which otherwise provide useful services for communication and sharing among users.

In view of these issues, what are needed are improved tools, strategies, and techniques for evaluating the identities of different entities, to defend consumers and enterprises from social identity theft and fraud, and to assess risks associated with other entities based on analysis of social networking data.

DESCRIPTION

Figure 1:
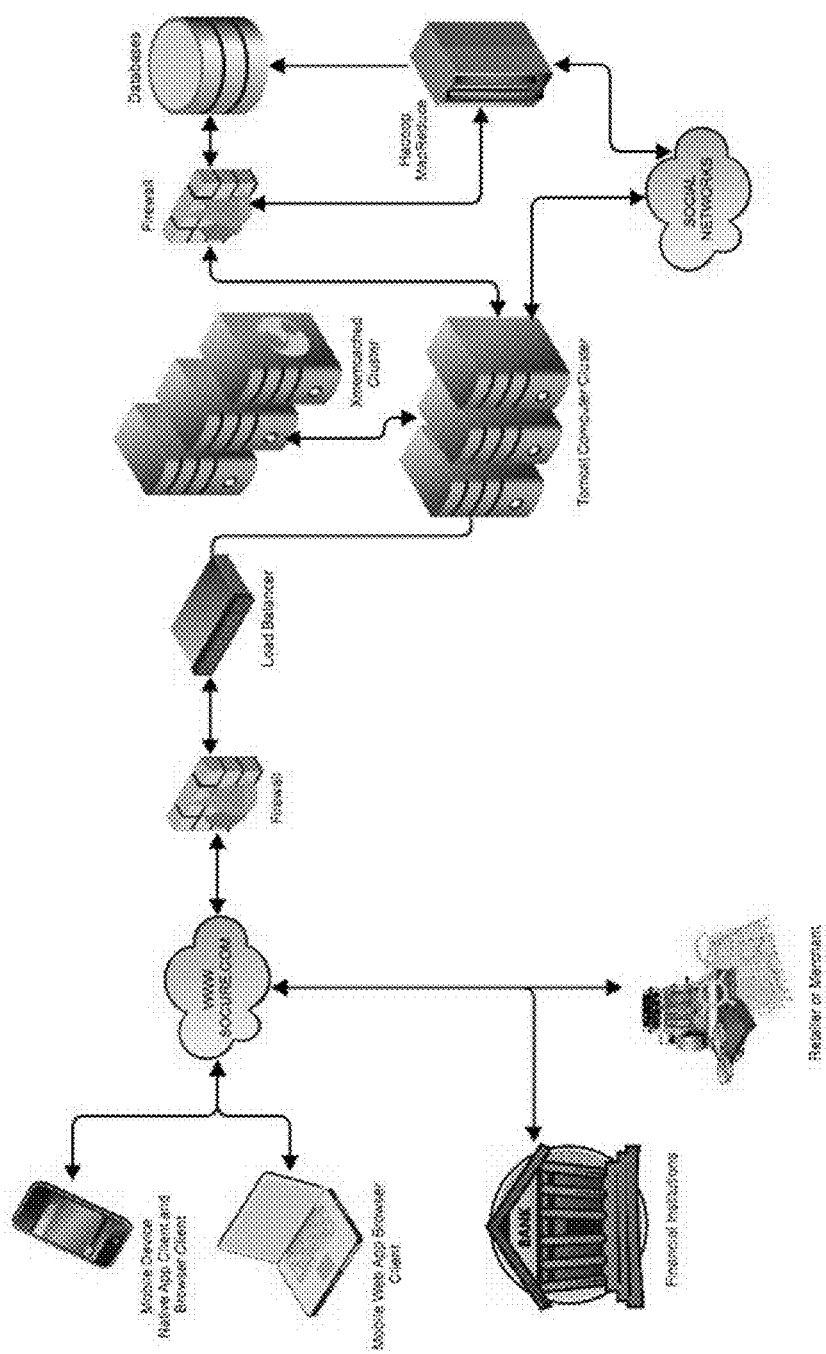
FIG. 1 provides an example of a computer system architecture that can be structured in accordance with various embodiments of the invention.

In various embodiments, the invention offers tools, strategies, and techniques for evaluating the identities of different entities to protect individual consumers, business enterprises, and other organizations from social identity theft and fraud. Risks associated with other entities can be assessed through the system based on analysis of social networking data, for example. As applied herein to various embodiments of the invention, the terms "Socure" and "Socure service" may be used to refer to examples of methods, systems, processes, algorithms, and other tools structured or configured in accordance with various embodiments of the invention.

It can be appreciated that the tools, techniques, and strategies represented by various embodiments of the invention described herein can be beneficial to various users, businesses, or other entities. Both individuals and businesses can access a Socure system that can be configured to scan, aggregate, and organize their social networking data and other network data to generate a social graph that provides feedback through an infographic profile. In this manner, the user can be alerted as to what data needs to be corrected or otherwise addressed. Users can employ the social graph as a feedback loop to remediate data privacy issues, address vulnerability issues, and perhaps improve scores derived from the social graph to obtain the best possible online resume. Through the Socure system, users can be informed when links on their network connections, their friends' network connections, their business connections, and/or their professional connections represent a threat.

The inventors have recognized the need for appropriate security for online financial transactions, and that there is also a need to monitor, manage and protect online reputation. Whether through self-inflicted inappropriately uploaded content to a social network, maliciously generated content, or simple guilt by association with someone with a similar name, risks of damage to online reputation are growing. The need for comprehensive privacy and identity theft protection is growing exponentially as consumers share more data online and through social media. Many employers and educational institutions screen candidates at least in part through the filter of their social media profiles. Identity theft is rampant in view of consumers sharing an enormous amount of personal information online without an understanding of how their images are presented or perceived by others. Many businesses and professionals have reported huge losses when false or misleading negative reviews and items appear about them online. The importance which schools, workplaces, and potential business associates place on apparent social reputation should not be underestimated. For corporations, online reputations are critical, as they can dictate how much revenue the company can achieve, the kind and quality of employees the company can recruit and hire, and can even impact the ability to attract investors.

From expanding the reach of an organization in its industry to promoting professional expertise in a field, social technology is a vital tool. If managed properly, it can enhance personal, professional and institutional online reputation. It is difficult for organizations, enterprises, or professionals to exist commercially without a solidly established and cultivated online presence.

The invention may include systems and methods for evaluating risk of financial fraud and identity theft by employing social graph and financial behavioral patterns, for example. In various embodiments, the invention can incorporate data related to social behavior into the mix of measures used to detect and avoid fraud, which has the potential to reduce losses to financial institutions, businesses, individuals, and other entities. In addition, a consumer's experience can be improved by significantly enhancing the authentication process and reducing false positive friction.

In various embodiments, the Socure system can provide a scalable solution and tools that businesses and individuals can use to help them protect the privacy of their data and to enhance their reputations in various online environments. Examples of these online environments include social networking sites (e.g., Facebook, Twitter, etc.), professional networking sites (e.g., LinkedIn), and/or other web-based or online environments. In certain embodiments, the Socure system may be implemented to combat the growing risk of identity theft and related financial fraud in a social and mobile device world. It can be appreciated that different behaviors or activities conducted by a user through different networks can impact the reputation of the user. In certain aspects of the invention, an authenticity score and associated algorithms can be provided as a robust anti-fraud model that combines consumer social behaviors with spending patterns across credit, debit and ACH transactions, for example. In addition, the Socure system can expose secure web-services that financial institutions consume in their transaction flows to improve their siloed financial fraud risk models and thereby reduce fraud losses, user experience friction, and fraud remediation costs.

FIG. 1 provides an example of a computer system architecture that can be structured in accordance with various embodiments of the invention. In the example shown, the Socure service can be delivered as an SaaS model (Software as a Service) in a cloud-based computing environment. Consumers can access the Socure system by signing up at a native mobile application, for example, which can made available for smart phone devices, or by visiting the Socure website at http://www.socure.com to sign up through a web-based application. Socure mobile applications and web-based applications can provide ways for consumers to interact with the Socure service through the cloud, to be notified or alerted when a privacy or security threat is identified by Socure, to monitor their own social network accounts (as well as those of family and friends), and/or to detect threats from hackers, spam bots, undesirable fake profiles, or other malicious software or activity.

Figure 2:
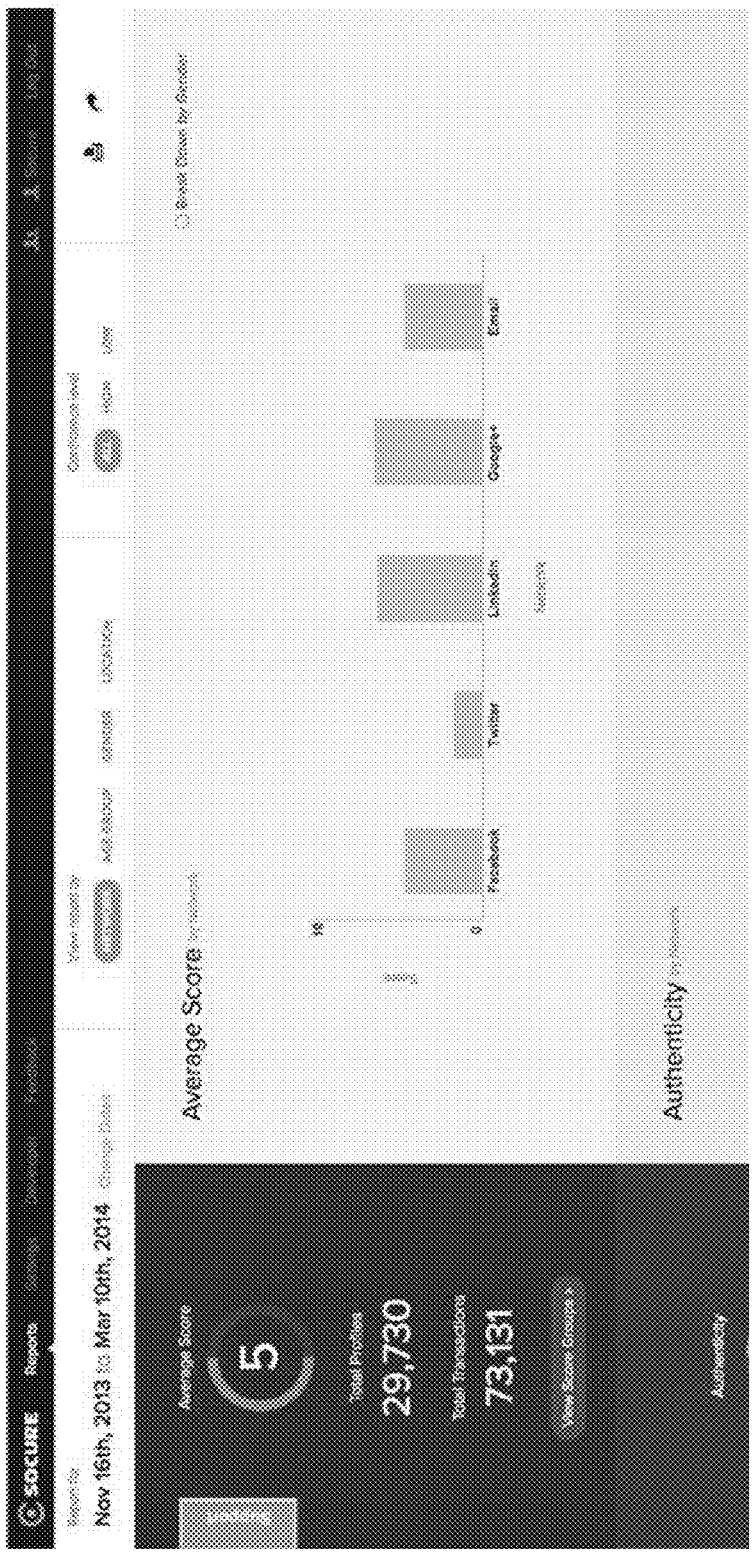
FIG. 2 includes a screen display illustrating an example of a dashboard which can be generated in accordance with various embodiments of the invention.

Various enterprises (e.g., financial institutions, merchants, retailers, educational institutions, or other organizations) can access the Socure system by calling the Socure system's web-service APIs, for example. Through the Socure system, enterprises can inject information or data about customers or other users involved in transactions (such as user registration, authentication, authorization, sending payments and remittance, making purchases, etc.). In various embodiments, the Socure system can calculate and generate scores that indicate a degree of authenticity of the different entities participating in transactions, and the risks they may pose with respect to fraud or money laundering, for example. In certain embodiments, the Socure system can process threats in realtime across multiple social networks such as Facebook, Twitter, LinkedIn, Google Plus, or other networks. The system can then process and store summary data about people and their friends or other entities in a secure database and batch processing system. For example, an enterprise can access this information on the Socure web site via an onscreen dashboard, as shown in FIG. 2.

Figure 3:
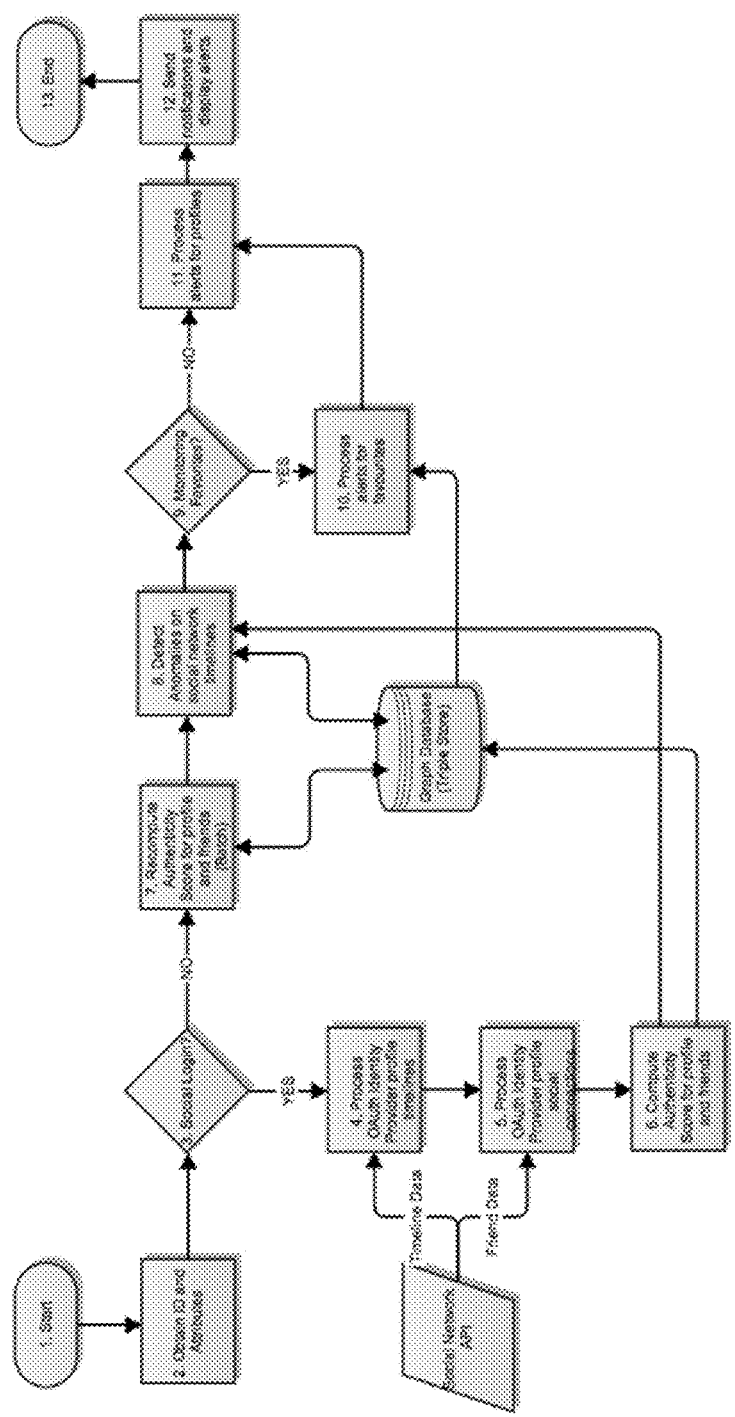
FIG. 3 includes a process flow diagram illustrating an example of how authenticity scores can be calculated for one or more user accounts in accordance with various embodiments of the invention.

FIG. 3 shows examples of process steps that the Socure service may take in order to verify the authenticity of each user and their friends or other contacts. The Socure system can be based on the principal that users' social network usage patterns and their interaction patterns with their friends or other contacts on those networks forms a unique, biometric "who you are" signature for each user.

In various embodiments, the Socure system can apply a social attestation model to verify if a user profile on a social network represents a real or fake person or entity. This analysis can be based on a combination of heuristics, as well as statistical probability measures, which take into account various attributes of the user's social network profiles, timeline activities, and/or interaction with friends and family members in order to arrive at a semantic score for each user profile. In one example of this scoring system, scores can graded from 1 to 10 semantically, where a score of 10 indicates a high degree of authenticity (real person) and score of 1 means low authenticity (fake person).

In various embodiments, a user can log on to the Socure system using a social network of their choice. The social network may ask for permission from the user to grant profile and timeline access to the Socure system. Once the user grants access, the Socure system can scan that user's social network profile information, friends graph, timeline content, installed applications, privacy settings, and/or other network data. A heuristic and statistical model can then be applied to determine if the user's profile is similar to a fake profile on the social network. Also, an authenticity score can be calculated for one or more users and their associated user accounts.

The Socure system may maintain different models of fake profiles for different social networks and may apply the respective model for each social network account that the user links together in a Socure system account to produce an overall authenticity score. In certain embodiments, the Socure system may compute the authenticity score for the user, as well as for the user's friends and connections for each social network that the user links and monitors. The Socure system can store the summary fingerprint information or authenticity scoring data along with statistical summary data for each user.

If the user has previously registered with the Socure system, the Socure service can periodically refresh the authenticity score and summary data for each user based on the latest activity and profile information available. This may be accomplished by using the social network APIs, for example. The Socure system may use the real-time feed APIs of supported social networks to monitor the user subscribed accounts for any activity that is outside the user's normal usage pattern or usage patterns of people similar to the user. The Socure system may also scan the user's installed list of applications and/or the user's security or privacy settings on various social networks to identify where private data may be leaked. In various embodiments, the Socure system can be configured to generate alert notifications for the user based on the threats identified.

In certain embodiments, if the user has configured Favorites (e.g., favorite friend profiles to monitor), then the Socure system can process the activity streams of those Favorite friend profiles to identify possible threats such as connection requests from fake profiles or from profiles that may pose a threat to the privacy and security of the user's friends. For example, consumers who are parents can monitor the activity of their children on social networks to be assured that they are not friending suspicious people. The Socure system can combine or consolidate the alerts and notify the user via a mobile application and/or via a web-based application. Based on the user's preferences that have been set in the Socure system, the system may notify the user via a post on one or more of their social networks and/or via email or text communication, for example.

In various embodiments, the Socure system may include a financial security module that extends various aspects of the security services and capabilities described herein to a consumer's financial accounts, for example. Users may be permitted to step up to a preferred tier of service, for example, in which they can add their bank, credit card, and/or debit card accounts into the Socure system for monitoring and analysis purposes. By implementing the financial security module, the Socure system can combine the financial user behavior patterns detected with analysis of authenticity patterns to improve the system's learning capabilities and to reduce false-positives.

In various embodiments, the Socure system may employ semantic or statistical machine learning techniques and algorithms to identify anomalous usage and threat patterns, and/or in conjunction with one or more heuristic rules defined in the system, to generate new knowledge in the system autonomously. This can make the system "smarter" as the amount of user data processed by the system grows over time. As a user's authenticity grows or is improved, the Socure system may allow the user to progress through multiple tiers of service to gain exclusive partner offers and rewards, for example.

Figure 4A:
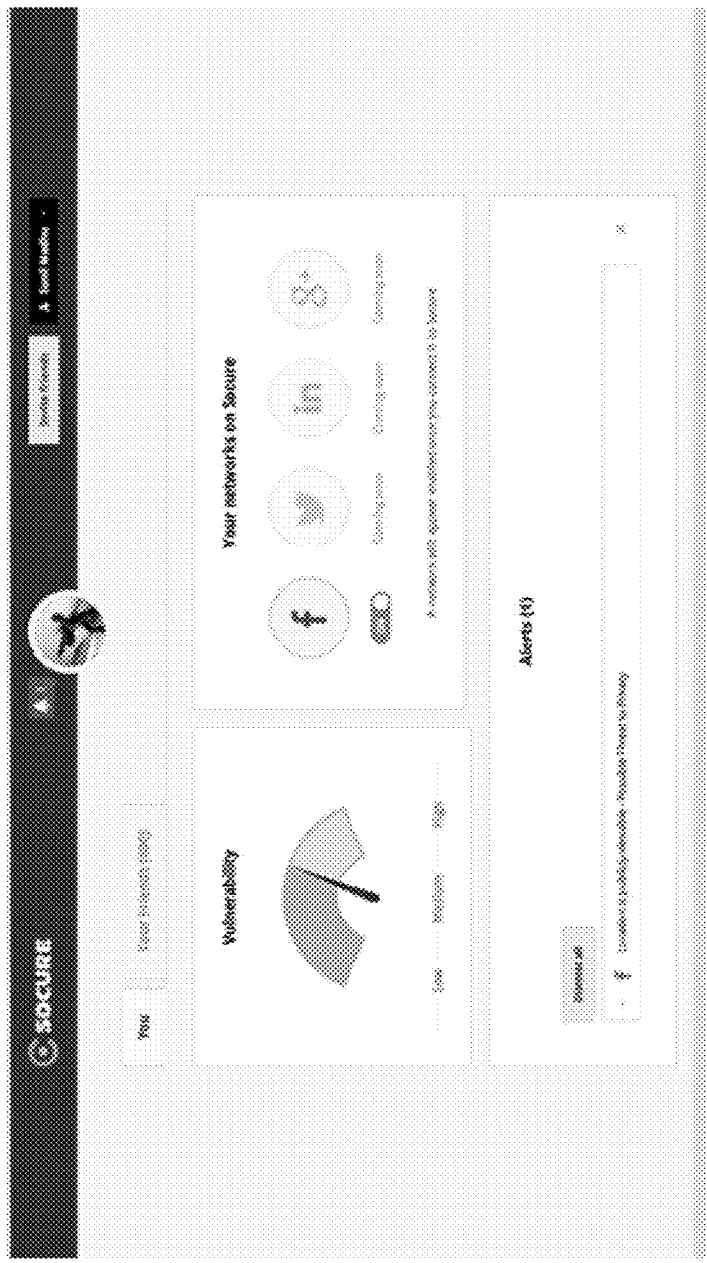
FIGS. 4A and 4B include screen displays illustrating different aspects of an example of a dashboard which can be generated in accordance with various embodiments of the invention.
Figure 4B:
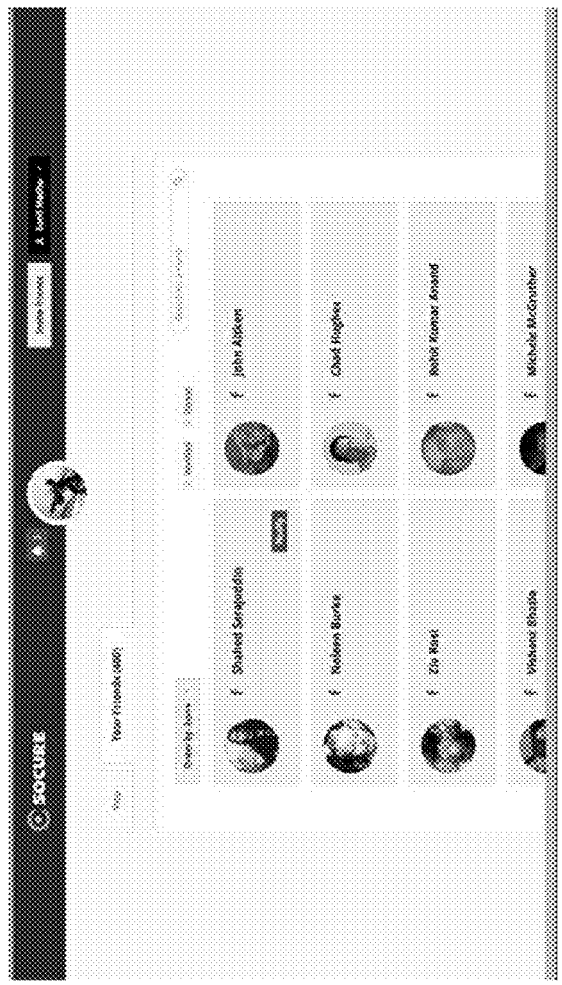

With reference to FIGS. 4A and 4B, after accessing the Socure system through a social network, the user can be directed to a main Socure system dashboard page showing the user's authenticity, threat and informational alerts, as well as favorites and linked accounts, among other potential data displays. In certain embodiments, updates on current cyber security news and warnings in the social media space can be communicated to users through the system. Also, users may be incentivized to maintain their Socure system profile through rewards offered by the system.

In the example of a dashboard page shown in FIGS. 4A and 4B, the user's overall vulnerability can be based on threats posed to the user by virtue of privacy concerns, the security configuration of social network accounts, sensitive private information leakage on timelines or profiles, anomalous activity from their accounts, and/or other data or factors. Different components may be displayed on the dashboard, such as an authenticity score which rates how authentic the user's profile is and what can be done to improve the authenticity. In certain embodiments, analytics about social network usage patterns and leader boards of similar patterns for friends, top connector friends, people who are similar, etc., can also be displayed. The dashboard may also display a section to let the user easily link supported social networks by accessing a switch tool. The user may be prompted by the social network to which they are linking to authorize the Socure system to access the user's profile, activity and friend data, for example. Accounts can be unlinked just as easily by switching the account off, for example. When accounts are unlinked, the Socure system may delete or archive user data pertaining to that account based on the user's privacy settings in the Socure system. The dashboard may also include an alerts section that the user can interact with to obtain details about the alert, to fix the problem behind the alert, and/or to dismiss each alert. The user can also dismiss multiple alerts by clicking on a "dismiss all alerts" button, for example. In certain embodiments, if the user has set favorite friends to monitor, then a section can be displayed with profile images tiles similar to the ones displayed on the Friends page.

FIG. 4B includes an example of a screen display that shows the user which of their friend accounts are suspicious or pose threats to their privacy and security. Selecting a friend profile lets the user invite that friend to join the Socure service, to notify that friend of a threat the Socure system has detected, or to learn more about why that friend profile poses a threat. In addition, an authenticity score can be calculated and displayed for each friend as well an indicator of the overall sentiment about that friend derived from mutual friend connections. In certain embodiments, users may be able to explicitly take action through the Socure system's web applications or mobile applications to designate a friend as trusted or not as a way to better train the system and reduce false positives. Other examples of summary screens that can be generated by the Socure system may be configured to display vulnerability information or vulnerability status, among other data, for various friends, professionals, colleagues, or other contacts. In various embodiments, the Socure system can display each friend profile with a visual color-coded representation. For example, the color red may represent profiles that are likely to be inauthentic or that may pose a threat. In another example, green may represents profiles that are likely to be authentic.

Enterprises such as banks, insurance agencies, credit card agencies, merchants, or retailers may use the Socure system's identity proofing solution on a transactional basis to fight against fraud in the form of identity theft fraud, account take over fraud, payments fraud, money laundering fraud, merchant fraud, and/or many other types of criminal activity. Enterprises also gain the benefit of reduction in false-positives that exist in their proprietary risk and fraud models.

In various embodiments, the Socure system exposes secure JSON/REST and SOAP/XML APIs, for example, for enterprises to call the Socure service on an as-needed basis when certain types of transactions occur. The Socure system can provide an additive signal to enterprise proprietary system signals that indicate fraud or trust risk, for example. The types of transactions that the Socure system may be configured to protect against include registration transactions, login transactions, and/or payment transactions, for example. In another example, the Socure system can extend its model to other types of transactions that depend on identity proofing for non-repudiation purposes based on customer needs. The Socure system's API calls can be secured for enterprises using federated identity and access management standards including SAML, WS-SEC, WS-FED, and/or XACML, among others.

Figure 5:
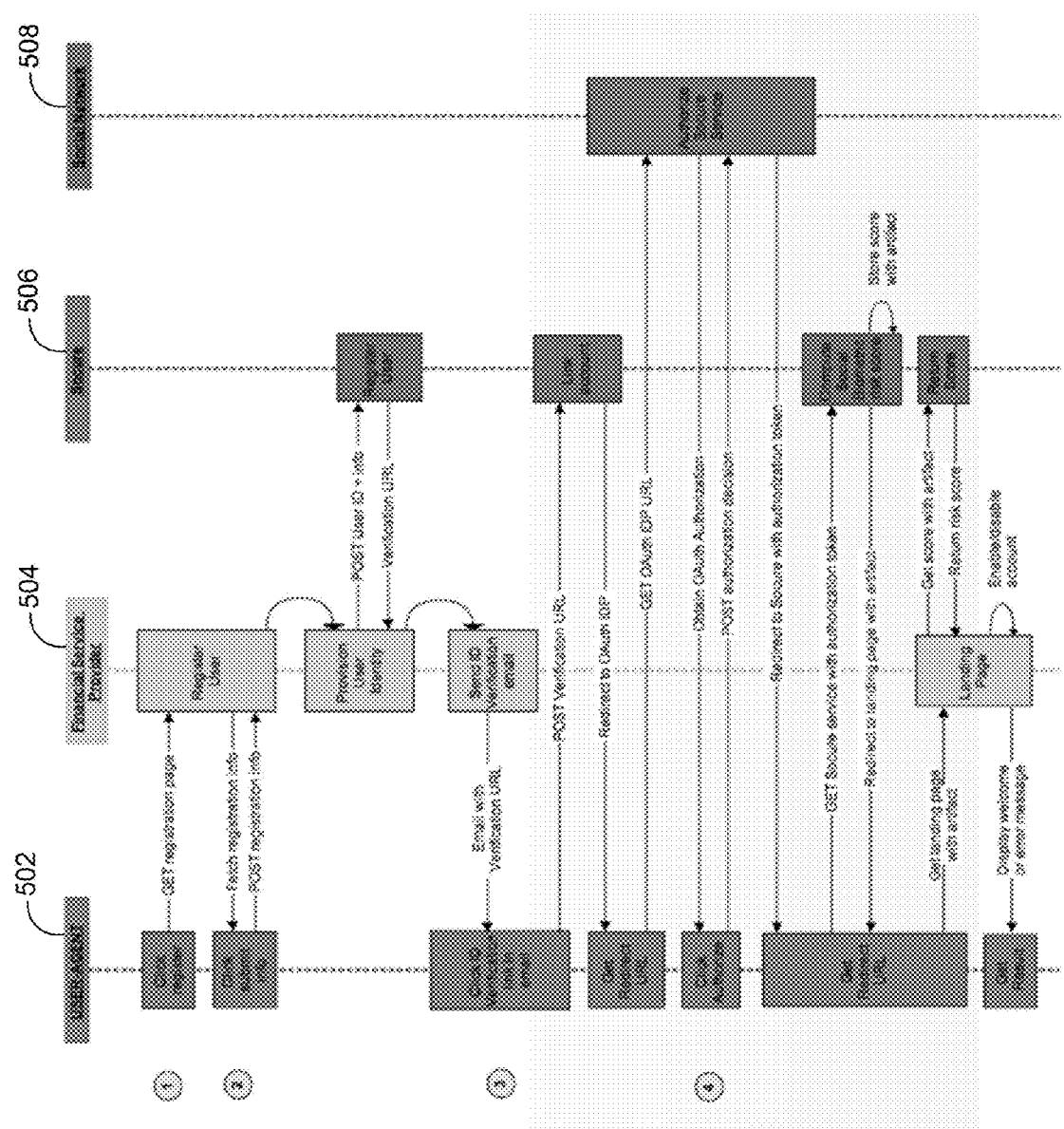
FIG. 5 illustrates an example of a process flow that may occur in association with an enterprise interacting with a system structured in accordance with various embodiments of the invention.

The Socure system creates, in various embodiments, a zero-touch integration for enterprises to be able to score their customers through the Socure system, using e-mail communication, for example, as a way to onboard new users to the Socure service. This mechanism ensures that current enterprise registration workflows and business logic are not significantly impacted. FIG. 5 illustrates an example of the flow of calls that may occur in association with an enterprise (e.g., a financial institution) interacting with the Socure system, perhaps as part of a registration transaction process. As shown, the User-Agent column 502 represents a user's browser. The Financial Service Provider column 504 represents an enterprise. The Socure column 506 represents the Socure web services, and the Social Network column 508 represents the network that the consumer is selecting to protect and monitor. When a new user registers an online account at the enterprise's website or mobile application, the Socure system can expose an API that lets the enterprise communicate the enterprise's federated identifier data and meta-data about the new user and the transaction context.

In various embodiments, the Socure system can generate a unique fragment of code that the enterprise can add to its own e-mail marketing to its customers, along with incentives and rewards for social attestation and identity proofing through Socure. When the user opts into the service by clicking on a link in the e-mail, for example, the user can be redirected by the Socure service to their social network of choice to start the attestation process. The user may then be sent back to the Socure service which can redirect the user to the enterprise's landing page of choice with scores calculated by the Socure service. In one example, an e-mail may be formatted and communicated to a user including various incentives, rewards, and/or partner offers for identity-proofing the user account through the Socure system.

Figure 6:
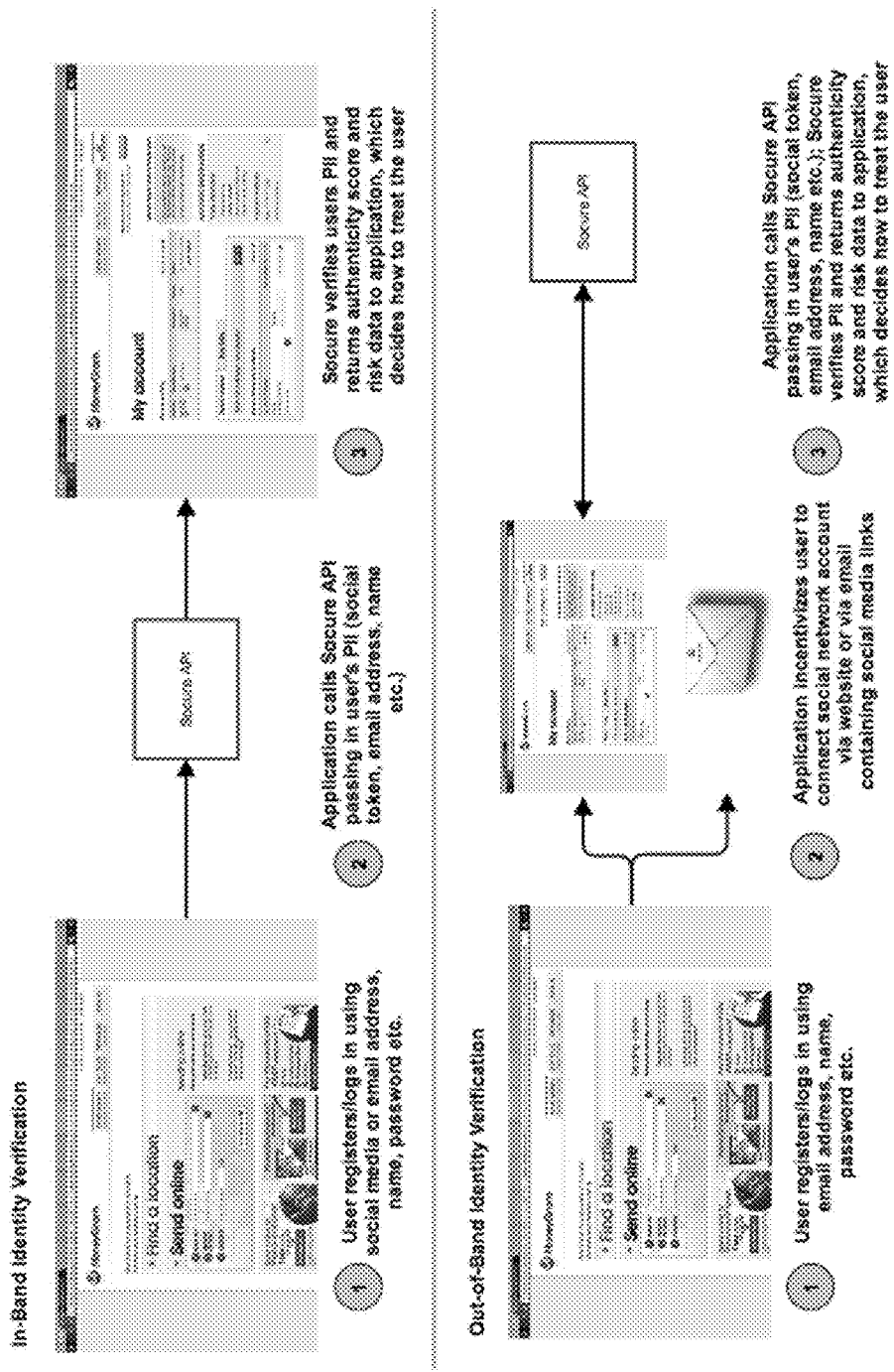
FIG. 6 includes an example of a transaction process flow that can be followed in accordance with various embodiments of the invention.

Various embodiments of the invention can be applied to payment service providers and their associated transactions (see transaction process flow example shown in FIG. 6). The Socure system can provide tools to verify the authenticity and integrity of: plastic card/mobile transactions in real-time (detection and resolution); consumers and institutions (mutual authentication); and/or online transactions (transaction verification). The options offered to consumers to engage in financial transactions continue to grow and change almost daily. Accordingly, the types and amount of information requested from and generated by consumers is also expanding. With the advent of financial technologies such as NFC, mobile payments, P2P lending, social media payments and ACH-less bank transactions, new businesses and new threats have emerged. Various embodiments of the Socure system can be used to execute fraud detection software providing financial institutions with enhanced cost savings and increased ROI from their consumer-based financial transactions. This can be accomplished by providing financial institutions with a social signal that offers a more expansive, more relevant and more valuable data set than prior risk evaluation methods. The Socure system therefore employs a consumer's social graph to proactively protect social data, financial data, and personal data against fraud and identity theft.

Figure 7:
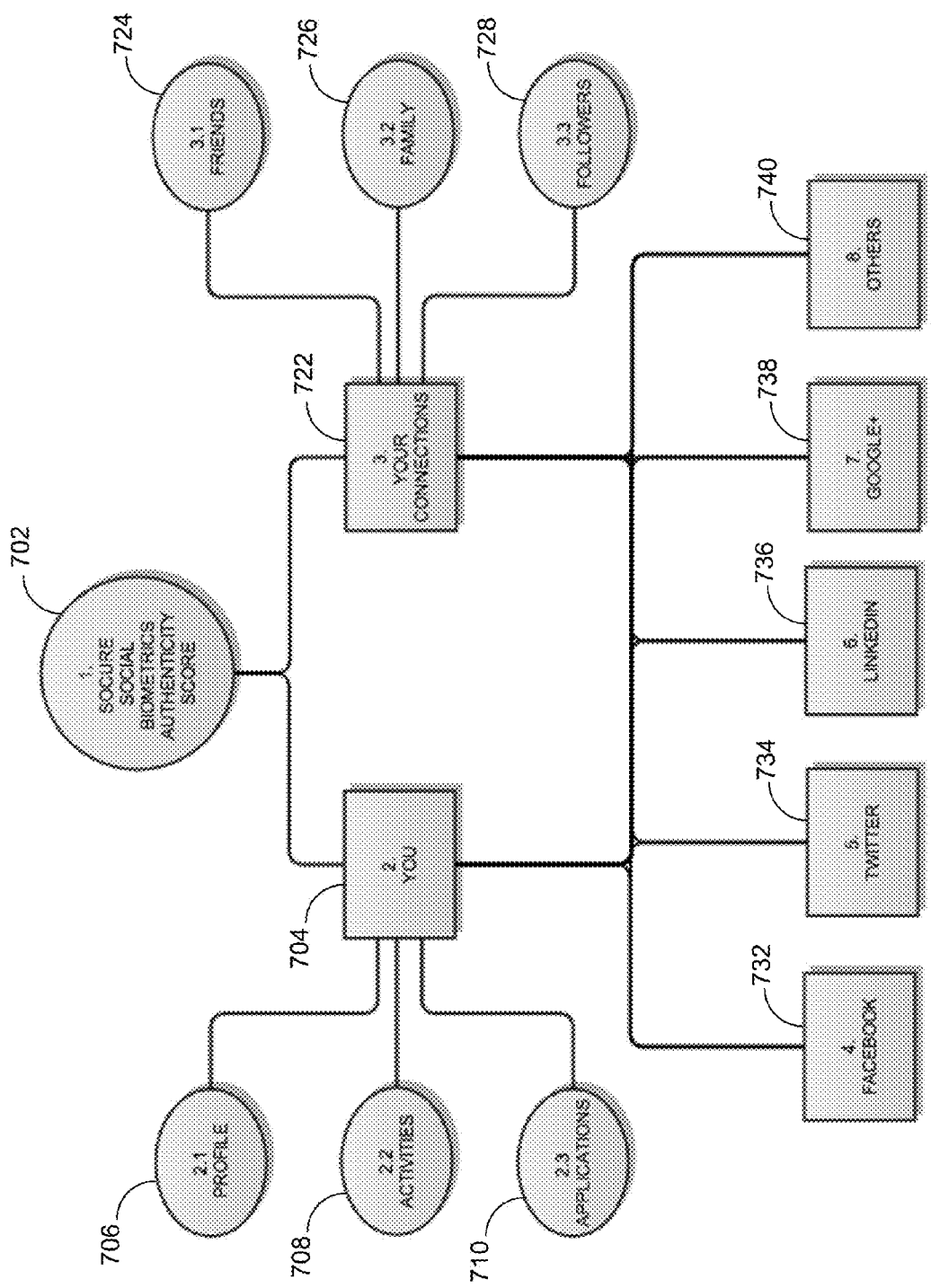
FIG. 7 illustrates a process flow diagram illustrating an example of how authenticity scores can be calculated for one or more user accounts in accordance with various embodiments of the invention.

FIG. 7 illustrates an example of how the Socure system authenticity score can be calculated. In various embodiments, the Socure system's authenticity score (item 702) for a user can be a normalized weighted score computed based on an weighted factors about the user (items 704-710) and the user's connections (items 722-728) across multiple social networks, professional networks, or other networks (such as Facebook, Twitter, LinkedIn, etc.—see items 732-740) to which the user is linked and which are further linked to the Socure system. It can be appreciated that a variety of data may be obtained and processed which are related to such networks, for example and without limitation, contact information, friends, professional connections, birth date, timeline activity, and many others. These data may be scored with a range or ranking of numerical values, for example, on various types of scales (e.g., 1 to 10) in connection with the processing and calculation of the authenticity score.

For a user registered through the Socure system, an algorithm processes the user's profile data (item 706) taking into account the private and public views of the profile attributes to identify sensitive attributes that may be exposed without the user's knowledge. For example, a user's place of birth, name of high school, or favorite pet's name are attributes that are often used to reset forgotten passwords and that could be used to commit account takeover fraud.

The algorithm can process the user's activity feeds and timelines (item 708) calculating the frequency of posts, including calculating a mean and standard deviation for the post frequency. These calculations may then be used to identify the user's burst usage pattern and establish a baseline. The algorithm can also check the identity of the accounts making posts to distinguish between the user's own posts versus posts from the user's connections, for example. The algorithm may then classify each post into categories based on post content (e.g., news item, video, photo, etc.). The algorithm may also calculate the number of social interactions for each item posted (e.g., likes, shares, retweets, etc.). In certain embodiments, the algorithm may also incorporate meta-data about each post such as a location of a user when a post occurred to keep track of the user's frequently traveled locations.

The algorithm can be programmed to process the user's installed applications for the social networks (item 710) and the attributes of those applications. The profile data (item 706), activity data (item 708) and application data (item 710) may also be used to identify the user's vulnerability or exposure to security and privacy risks and/or to generate alerts to help the user remedy the vulnerabilities in the social profiles. The algorithm may apply a social network specific model (domain ontology) for a fake account on each of the different types of networks and then compute a profile score for the user based on the positive and negative factors for the user's profile, activities and applications to compute a user score.

The algorithm may also process data associated with the user's social connections, including with the user's friends (item 724), family (item 726), and followers and peers (item 728). The algorithm may be executed based on each social connection to score those connections. The algorithm may then normalize the score to arrive at a connections score.

The algorithm may compute an affinity score by computing the overlap between profile attributes, activities, applications and connections of the user and each friend to calculate the score distance between the user and each connection. The affinity score can be used to bias the algorithm and strengthen the authenticity of the user if the user shares strong connections or weaken the authenticity of the user if the user does not share many factors or data in common with their connections.

In certain embodiments, the user score, connections score, and affinity score may be adjusted to make sure they are positive. Then the scores can be combined to yield an overall measure of authenticity for the user, which can be provided as a score in the range of 0 to 1, for example. This score can be scaled as desired to fit a presentable score range by multiplying a scaling factor (e.g., multiply by 100), and dropping any decimal remainder, to yield an authenticity score for the user.

In various embodiments, the algorithm can be configured to compare the user's authenticity score against average score ranges for clusters of people, businesses, or other entities with similar affinity scores, for example. This can be used to determine a mean and standard deviation that can be applied to determine how accurate a score can be considered for a general Socure system user population, thereby gaining an understanding of whether the score is trustworthy or an outlier. This data can be used to improve the fake user model for each network.

Figure 8:
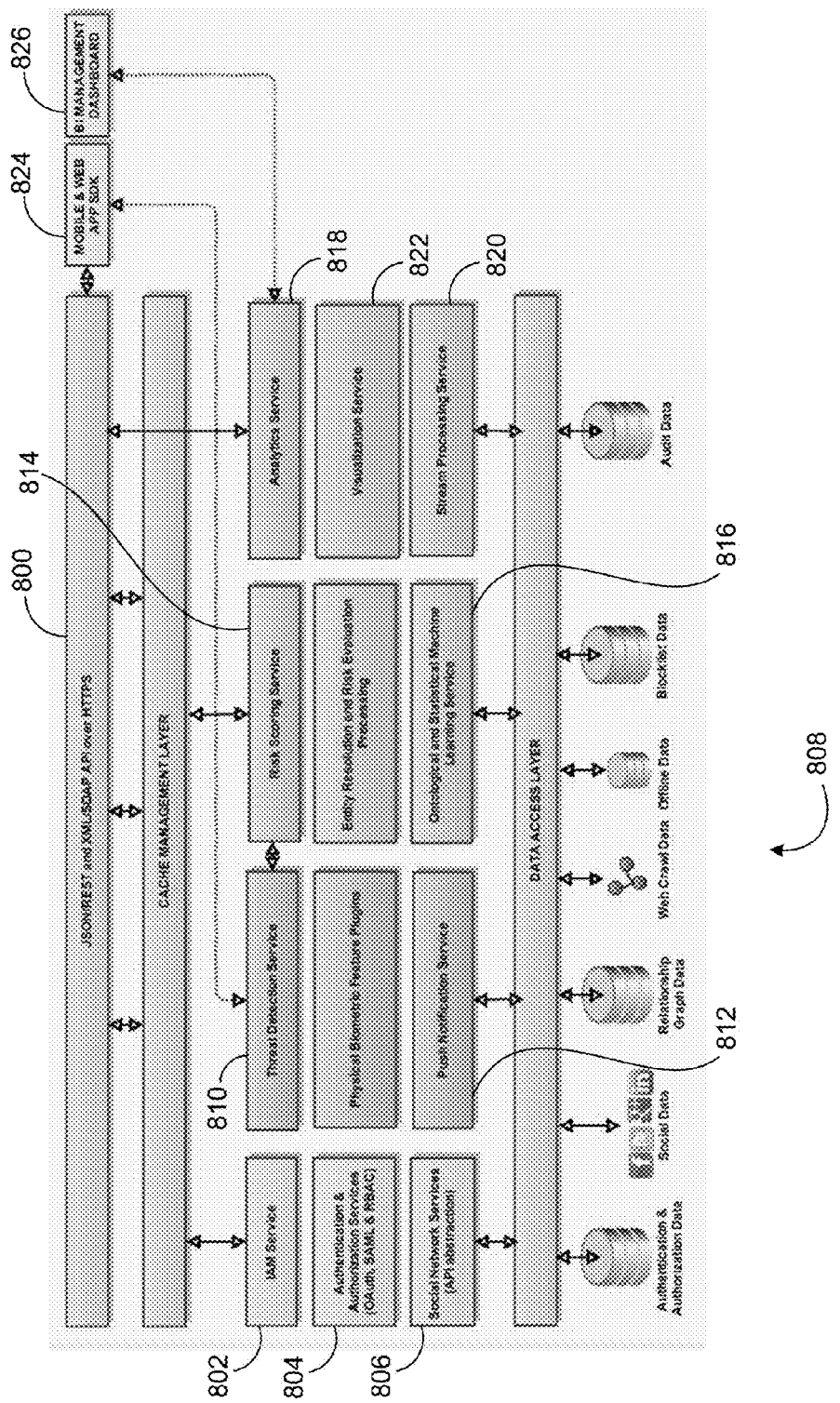
FIG. 8 includes an example of a system architecture for one embodiment of a Socure system structured in accordance with various embodiments of the invention; and, FIG. 9 schematically depicts an overview of one embodiment of an architecture for implementing different embodiments of systems and methods structured to perform various tasks and functions in accordance with various embodiments of the invention.

FIG. 8 includes an example of a system architecture for one embodiment of a Socure system structured in accordance with various embodiments of the invention. As shown, the system may include various components configured for performing various functions or tasks for embodiments of the Socure system. Module 800 depicts a REST/JSON or XML/SOAP protocol which may be used by the system as a protocol specification for exchanging structured information in the implementation of Web Services in computer networks. It relies on Extensible Markup Language (XML) for its message format, and usually relies on other Application Layer protocols, most notably Hypertext Transfer Protocol (HTTP), for message negotiation and transmission. Module 802 includes an IAM service that can be implemented by the system. Identity management (IdM) describes the management of individual identifiers, their authentication, authorization, and privileges within or across system and enterprise boundaries with the goal of increasing security and productivity while decreasing cost, downtime and repetitive tasks.

Module 804 includes an authentication and authorization services module. OAuth provides a method for clients to access server resources on behalf of a resource owner (such as a different client or an end-user). It also provides a process for end-users to authorize third-party access to their server resources without sharing their credentials (typically, a user-name and password pair), using user-agent redirections. Security Assertion Markup Language may be used in various embodiments. Module 804 can be used to implement multi-factor authentication services for the system. Multi-factor authentication is an approach to security authentication that involves the user of a system providing more than one form of verification in order to prove their identity to gain access to the system. Multi-factor authentication takes advantage of a combination of several factors of authentication. These factors may include verification by something a user knows (such as a password), by something the user has (such as a smart card or a security token), and by something the user is (such as the use of biometrics). Due to their enhanced complexity, authentication systems using a multi-factor configuration can be harder to compromise than others that use a single factor.

Module 806 includes a social network services module which can be programmed to allow users to opt into the Socure service or system. A user may sign into the Socure system by using one or more social network identities.

Various data storage media 808 can be provided to store data in association with operation of the system. The data storage media can be programmed for storage and retrieval of authentication and authorization data, for example. Certain data storage media 808 can be programmed for collecting and storing biometric data or biometric identifiers, for example, which are distinctive, measurable characteristics used to label and describe individuals. Biometric identifiers are often categorized as physiological versus behavioral characteristics. A physiological biometric can identify a user by voice, DNA, hand print or behavior. Behavioral biometrics are related to the behavior of a person, including but not limited to: typing, rhythm, gait, and voice, among others.

Module 810 can be programmed to execute threat management services for the Socure system. This module 810 may be programmed to implement security and vulnerability management services that provide software tools for aiding in the discovery (and sometimes removal) of vulnerabilities in a computer system. These tools can provide an auditor with an overview of possible vulnerabilities present in the system.

Module 812 can be used to initiate notification services through the Socure system. The notification services module 812 offers a scalable server engine on which to run notification applications, with multi-server capability-providing flexibility and scalability for deploying applications. The notification services module 812 can help with developing and deploying notification applications that generate personalized, timely information to subscribers or other users. The module 812 can be applied in connection with designing, coding and testing components that make up a robust notification services application, such as notification scheduling, failure detection, retry logic, time zone management, notification grouping, and queue management.

Module 814 can be programmed to monitor and analyze a user's social network behavioral patterns as well as certain financial patterns to generate various scores which relate to identity authentication and risk assessment. Module 816 can be programmed to implement a machine learning engine in the system. Machine learning, a branch of artificial intelligence, relates to the construction and study of systems that can learn from data. Various data storage media 808 can be configured for storage and retrieval of scoring data generated in accordance with various scores calculated by the system. Examples of other modules or components that may be included within embodiments of the Socure system include, without limitation: an analytics service module 818; a stream processing service module 820; a visualization engine module 822; various data storage media 808 programmed for storage and retrieval of auditing data; a module 824 for managing mobile web applications or native applications (e.g., iOS, Blackberry, Android, etc.) and for depicting data and scores to users; a graphical user interface module 826 depicts data, such as dashboard information or other user interface screens; and/or potentially other modules.

Figure 9:
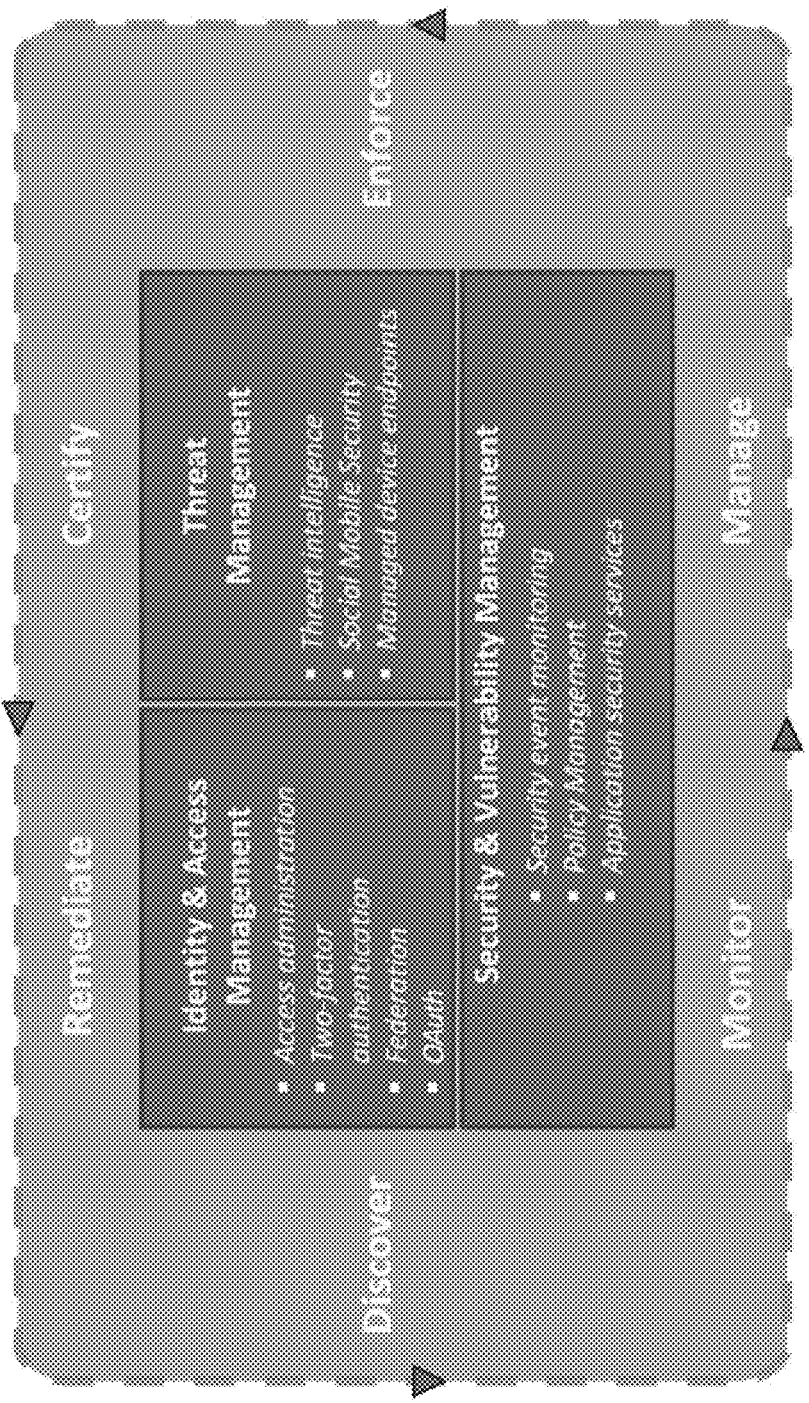

FIG. 9 schematically depicts an overview of one embodiment of an architecture for implementing different embodiments of Socure systems and methods structured to perform the various tasks and functions as described herein. As shown, various embodiments of the Socure system may be deployed in a cloud-based or SaaS computer architecture.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier) Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as described herein.

What is claimed is:

1. A computer-implemented method for calculating an authenticity score for a user account, the method comprising:
   calculating, by an electronic processor of a computer system, a user score in response to at least a portion of profile data associated with at least one social network or professional network of a first user account, wherein the calculation comprises comparing at least a portion of the profile data of the first user account to at least one fake profile model associated with at least one social network or professional network;
   calculating, by the processor, a connections score in response to at least one connection formed between the first user account and at least a second user account through the social network or professional network;
   calculating, by the processor, an affinity score in response to an overlap between at least a portion of the profile data of the first user account and at least a portion of profile data associated with at least a second user account;
   combining, by the processor, the calculated user score, the calculated connections score, and the calculated affinity score to yield an authenticity score for at least the first user account; and
   determining, by the processor, accuracy of the authenticity score for the first user by comparing the calculated authenticity score against an average score range for at least one cluster of other users with similar affinity scores, wherein the accuracy is used to improve the at least one fake profile model.

2. The method of claim 1, wherein the profile data comprise at least one of user contact information, friends data, birth data, or timeline activity data associated with at least one user account.

3. The method of claim 1, wherein calculating the user score further comprises processing at least one activity feed of at least the first user account by calculating a frequency of posting.

4. The method of claim 3, wherein processing the activity feed includes identifying a baseline posting frequency and a burst usage pattern for at least the first user account.

5. The method of claim 1, wherein calculating the user score further comprising checking an identity of one or more user accounts making a post to distinguish between a post by the first user account and a post by at least a second user account connected to the first user.

6. The method of claim 5, further comprising classifying at least one post into a category based on content of the post.

7. The method of claim 5, further comprising calculating a number of social interactions associated with at least one posted item.

8. The method of claim 5, further comprising collecting metadata associated with at least one post including a location accessed by at least the first user account.

9. The method of claim 8, further comprising using the collected location metadata to track one or more frequently traveled locations of at least the first user account.

10. The method of claim 1, wherein calculating the user score further comprising processing at least one attribute of at least one application installed on at least the first user account.

11. The method of claim 1, wherein calculating the user score further comprising comparing at least a portion of the data of the first user to multiple fake profile models associated with multiple networks.

12. The method of claim 1, wherein calculating the connections score includes processing data associated with connections formed between the first user account and at least one account associated with a friend, family member, follower, or peer of the first user account.

13. The method of claim 1, wherein calculating the affinity score includes computing the overlap between at least one profile attribute, activity, installed application, or connection of the first user account and at least one profile attribute, activity, installed application, or connection of the second user account.

14. The method of claim 1, further comprising communicating at least one alert to a user account in association with at least one of the calculated scores.

15. The method of claim 1, wherein calculating the authenticity score includes combining data associated with at least one transaction involving the first user account or the second user account.

16. The method of claim 15, wherein the transaction involves at least one of a user registration transaction, an authentication transaction, an authorization transaction, a payment transaction, a remittance transaction, or a purchase transaction.

17. The method of claim 1, further comprising communicating at least one of the calculated scores to an enterprise using an application program interface.

18. The method of claim 17, wherein the enterprise includes at least one of a business, an organization, a financial institution, a merchant, a retailer, or an educational institution.

19. The method of claim 1, further comprising calculating an authenticity score for at least the second user account.

20. The method of claim 1, further comprising generating an enterprise-based dashboard programmed to display:
   a number of transactions performed by one or more user accounts;
   at least one authenticity score associated with a plurality of user accounts;
   at least one authenticity score in association with at least one of a social network, a professional network, a domain, or a demographic characteristic; and,
   a graphical display including a representation associated with at least one of the scores or a combination of multiple scores.

21. A computer-implemented system for calculating an authenticity score for a user account, the system comprising:
   at least one processor, an operating system configured to perform executable instructions, and a memory;
   a computer program including instructions executable by the at least one processor to create an application comprising:
      a software module calculating a user score in response to at least a portion of profile data associated with at least one social network or professional network of a first user account, wherein the calculation comprises comparing at least a portion of the profile data of the first user account to at least one fake profile model associated with at least one social network or professional network;

a software module calculating a connections score in response to at least one connection formed between the first user account and at least a second user account through the social network or the professional network;
a software module calculating an affinity score in response to an overlap between at least a portion of the profile data of the first user account and at least a portion of profile data associated with at least a second user account;
a software module combining the calculated user score, the calculated connections score, and the calculated affinity score to yield an authenticity score for at least the first user account; and
a software module determining accuracy of the authenticity score for the first user by comparing the calculated authenticity score against an average score range for at least one cluster of other users with similar affinity scores, wherein the accuracy is used to improve the at least one fake profile model.

* * * * *

UNITED STATES PATENT AND TRADEMARK OFFICE
CERTIFICATE OF CORRECTION

| | | |
|---|---|---|
| PATENT NO. | : 9,300,676 B2 | Page 1 of 1 |
| APPLICATION NO. | : 14/215477 | |
| DATED | : March 29, 2016 | |
| INVENTOR(S) | : Sunil Madhu et al. | |

It is certified that error appears in the above-identified patent and that said Letters Patent is hereby corrected as shown below:

In the Claims

Column 15, line 53, Claim 5, please delete "comprising" and replace with --comprises--

Column 16, line 2, Claim 10, please delete "comprising" and replace with --comprises--

Column 16, line 5, Claim 11, please delete "comprising" and replace with --comprises--

Signed and Sealed this
Thirty-first Day of May, 2016

Michelle K. Lee
*Director of the United States Patent and Trademark Office*